April 3, 1962 A. H. FAULKNER 3,028,451
TRANSISTOR AMPLIFIER
Filed Nov. 1, 1956
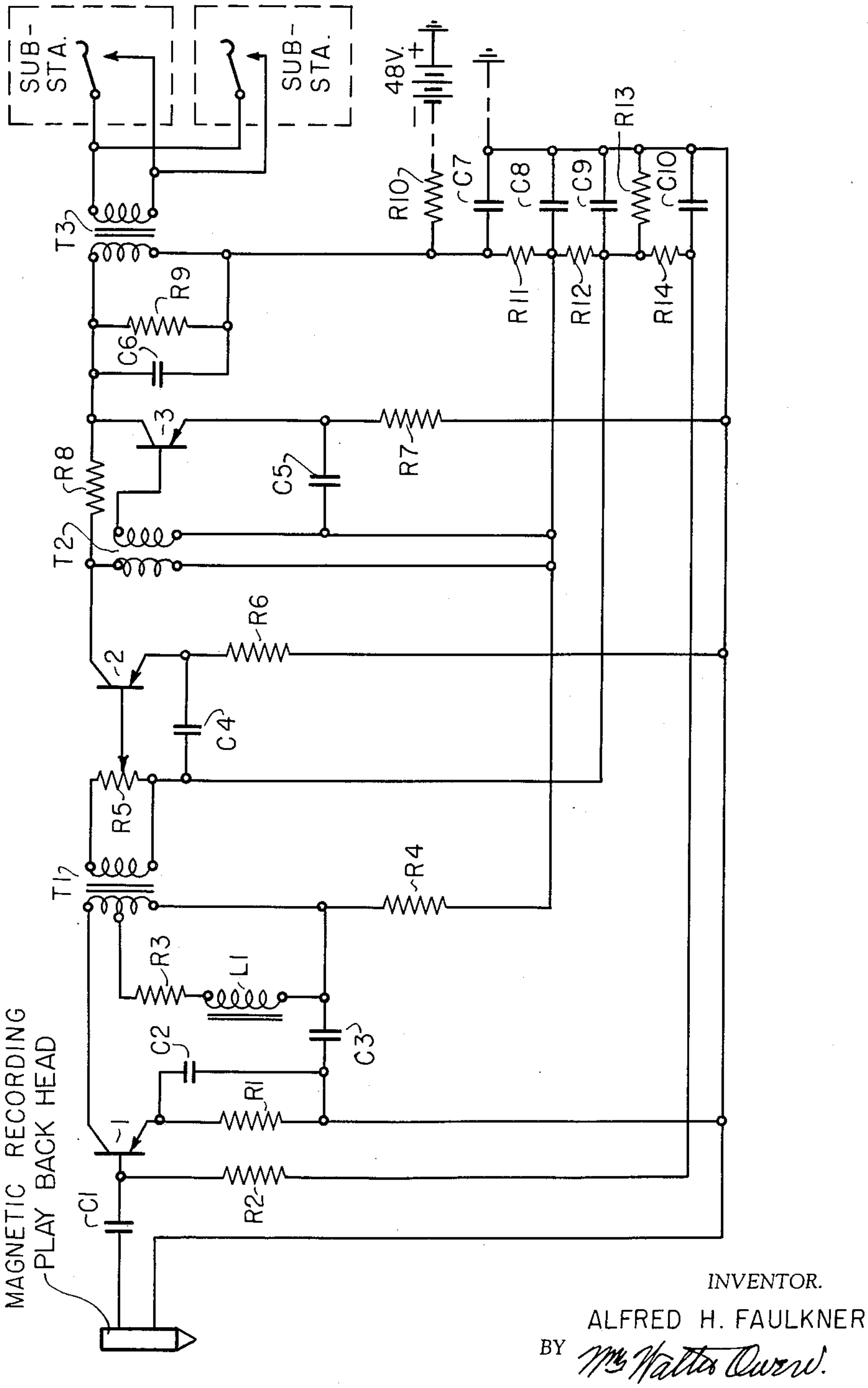
INVENTOR.
ALFRED H. FAULKNER
BY McWalter Owen.
ATTY.

United States Patent Office
3,028,451
Patented Apr. 3, 1962

3,028,451
TRANSISTOR AMPLIFIER

Alfred H. Faulkner, Chicago, Ill., assignor to Automatic Electric Laboratories, Inc., a corporation of Delaware Filed Nov. 1, 1956, Ser. No. 619,851
6 Claims. (Cl. 179—6)

This invention relates generally to an audio transistor amplifier and, in particular, to a multi-stage audio transistor amplifier with a magnetic recording playback head as the signal source and a variable number of telephones in parallel as the load.

The characteristic frequency response curve of a magnetic recording playback head when feeding an open circuit such as a vacuum tube amplifier increases with increasing frequency at the lower end of the audio frequency spectrum until a maximum response region is reached at a frequency dependent upon the recording medium and the operating speed and thereafter decreases with increasing frequency.

When a magnetic recording playback head feeds a transistor amplifier the input signal to the transistor no longer follows the open circuit frequency response curve of the magnetic playback head since the input impedance is relatively low.

At audio frequencies the input impedance of a transistor amplifier can be assumed to be a resistance. The analogous circuit of a magnetic recording playback head transducer feeding a transistor can be viewed as a signal generator, an internal resistance and inductance and a load resistor of a comparable magnitude all in a series circuit. The input signal to the transistor is that signal which appears across the load resistor in our analogous circuit. When the load impedance is many times larger than the internal impedance of the generator in the analogous circuit the signal at the generator appears across the load impedance.

However, where the load impedance and the internal impedance of the generator are of a comparable magnitude the signal across the load impedance will be the signal at the generator minus the drop across the internal impedance of the generator.

Therefore, it can be seen from our anologous circuit that the output frequency response curve of a magnetic recording playback head when feeding a transistor amplifier is the combination of the open circuit frequency response curve and the frequency response curve due to the internal impedance of our analogous generator.

Since the open circuit frequency response curve of a magnetic playback head increases with frequency at the low end of the audio frequency spectrum, the frequency response due to the internal impedance of the analogous circuit is not there objectionable since it tends to compensate for the open circuit frequency response. However the response due to the internal impedance of the generator in the analogous circuit is objectionable at higher frequencies since it causes the frequency response at the higher frequencies to fall off more rapidly.

The effect caused by the internal impedance of a magnetic playback head is dependent upon the value of the inductance of the head and the input impedance of the amplifier. When a high inductive magnetic playback head is employed as the signal source to feed a transistor amplifier the effect of the inductance at higher frequencies must be compensated for and a leveling off means provided.

Hereafter in this specification the effect caused by the internal impedance of the magnetic playback head in the analogous circuit previously described will be referred to as the "inductive" effect.

It is an object of this invention to compensate for the "inductive" effect of a high inductance magnetic recording playback head when the magnetic head is feeding a transistor amplifier.

It is another object of this invention to compensate for the "inductive" effect of a high inductance magnetic recording playback head which is feeding a transistor amplifier and at the same time provide an adequate method for operating the amplifier into a load composed of a variable number of telephones.

It is yet another object of this invention to provide a transistor amplifier which will compensate for the "inductive" effects of a high inductance magnetic recording playback head while reducing low frequency hum from stray A.C. fields and at the same time provide a method of adequately feeding a variable load composed of varying numbers of telephones in parallel.

The drawing is a wiring schematic of a three stage transistor amplifier with a high inductance magnetic recording playback head as the input and a varying number of telephones connected in parallel as the output and is but one embodiment of the invention.

The three transistors 1, 2 and 3 shown in the drawing are all used in the grounded emitter type of circuit in this embodiment of the invention. The input of the first stage of amplification is a high inductance magnetic playback head 4. The first stage of the amplifier contains a hum reducer and D.C. blocking condenser C1, an emitter biasing resistor R1, A.C. by-pass condenser C7, base biasing resistor R2, output transformer T1 with inductance L1 and resistor R3 serially connected from the center tap of the input windings to one side of the transformer T1, collector decoupling resistor R4, de-coupling condenser C3, and transistor 1. The transistors which appear in the present embodiment of the invention are of the P-N-P junction type but it is to be understood that this is a selection and not a restriction.

The second stage contains the output winding of transformer T1, with a potentiometer type resistor R5 connected across the winding as a gain control, an A.C. by-pass condenser C4, an emitter biasing resistor R6, transistor 2 and output transformer T2.

The third and final stage of amplification contains output windings of output transformer T2, A.C. by-pass condenser C5, transistor 3, emitter biasing resistor R7, negative feedback resistor R8 which feeds back to the primary winding of output transformer T3, and is inductively coupled through the secondary winding of output transformer T3 which extends the signal to the base of transistor 3, and condenser C6 and resistor R9 which maintain a minimum load on the transformer T3.

The power supply is a 48 v. D.C. source commonly encountered in telephone circuits. The power supply contains the voltage dropping resistors R10, R11, R12, R13, and R14, and the filter condensers C7, C8, C9, and C10. It can be readily seen by referring to the drawing that the emitter and collector are biased progressively higher from the first to the third stage since the signal increases progressively through the amplifier from the first to the third stage, and with the object of minimizing noise generated in the transistors.

The present embodiment of this invention discloses a high inductance magnetic recording playback head 4 which introduces a signal to the first stage of a transistor amplifier from base to emitter, the input signal from the magnetic playback head 4 will be the generated signal of the analogous circuit generator minus the drop across the internal resistance and inductance of the magnetic playback head minus the drop across condenser C1. C1 is utilized as a D.C. blocking condenser and a hum reducer. In the low frequency region C1 resonants with the inductance of the magnetic playback head to provide an appreciable boost in signal at about 100 cycles, followed by a rapid fall off at lower frequencies, thus reducing 60 cycle hum signals induced in the head from stray A.C. fields.

The input signal is amplified by the transistor in a well known manner and the amplified input signal appears across the load which is transformer T1. Across the center tap to one side of T2 there appears an inductance and a resistance in series. This is the electrical equivalent of a coil wound inductor. C3 is a de-coupling condenser inserted to prevent ground loops and distortion at higher frequencies.

To compensate for the "inductive" effect of the high inductance magnetic recording playback head the coil wound inductor, comprising resistance R3 and inductance L1, is connected across part of the primary of transformer T1, as is shown in the drawing. At this point it should be brought out that there would be no electrical difference if an equavalent inductor was placed across the whole of the input winding of T1, but for practical reasons it is chosen for this particular embodiment of the invention as it is shown.

The A.C. path of the output circuit of the first stage should now be explained. It goes from battery across R10, R11, R4, input windings of T1, with R3 and L1 in parallel, through the transistor 1 and across R1 to battery. The greater proportion of the A.C. signal would appear across the input windings of transformer T1, if inductance L1 and resistor R3 were not connected in parallel with transformer T1 as shown in the drawing.

It can be readily understood that at low frequencies the input windings of T1 will be shunted by the inductor resistor R3 and inductance L1 and as the frequency increases the total impedance of inductor resistor R3 and inductance L1 and the transformer T1 will increase, thus causing a greater drop across the transformer T2 and consequently a greater output.

As the frequency is increased the load impedance increases and so does the voltage drop across it, which in our case is the output. It is therefore apparent that the output of the first stage of the amplifier will increase with increasing frequency.

It can now be seen that the frequency response of the first stage of amplification compensates for the frequency response of the high inductance magnetic recording playback head, when feeding a transistor amplifier.

The output of the first stage of amplification is fed into the next stage across the base and emitter through the potentiometer type variable resistor R5. The setting of R5 determines the portion of the signal from stage one that is fed into transistor 2 and consequently functions as a gain control.

Condenser C4 functions as an A.C. by-pass condenser and R6 is the emitter bias resistor. The signal is here amplified again and appears across the input of transformer T2.

The output signal of transformer T2 is then fed into transistor 3 across the base and emitter and is amplified and fed into the output transformer T3. Condenser C5 is another A.C. by-pass condenser and R7 functions as the emitter bias resistor.

The output of transformer T3 may then be fed into a number of telephones in parallel as indicated in the drawing. The number of telephones which are fed by transformer T3 varies and consequently it is necessary to provide a low output impedance to obtain good voltage regulation and to minimize coupling between telephones.

Resistor R8 is connected between the collector of the output transistor 3 and the primary winding of transformer T2 which provides inductive coupling to the secondary winding of transformer T2 to the base of transistor 3, to provide a path for inverse feedback to lower the output impedance and also to reduce distortion, said inverse feedback decreases the output impedance, thereby minimizing the effects of changes in load which in this embodiment is a varying number of telephones.

Resistor R9 and condenser C6 are placed across the primary winding of transformer T3 to prevent regenerative feedback to the intermediate transistor stage when the load is very light.

The circuit components of the amplifier herein shown may be of the following values:

| | | | | | |
|---|---|---|---|---|---|
| R1 | ohms | 2200 | C1 | mf | 1 |
| R2 | do | 1500 | C2 | mf | 100 |
| R4 | do | 2200 | C3 | mf | .02 |
| R5 | do | 0–2500 | C4 | mf | 100 |
| R6 | do | 1000 | C5 | mf | 100 |
| R7 | do | 1200 | C6 | mf | .02 |
| R8 | do | 100,000 | C7 | mf | 25 |
| R9 | do | 22,000 | C8 | mf | 100 |
| R10 | do | 5600 | C9 | mf | 100 |
| R11 | do | 10,000 | C10 | mf | 100 |
| R12 | do | 2000 | | | |
| R13 | do | 1000 | | | |
| R14 | do | 3900 | | | |

Transistors 1, 2, and 3 may be of the 2N38 type, Magnetic Playback Head 4 may be of the Brush type BK-1091, Transformers T1, T2, T3 may be of the Merit Type A-3023.

What has been described is considered to be the preferred embodiment of my invention and it is to be further understood that modifications of both structure and manner of operation may be made without departing from the scope of my invention as defined in the claims which follow.

What is claimed is:

1. In combination a telephone line, a plurality of substations, means for connecting a varying number of said substations to said line, a voice frequency signal source, and amplifying means for supplying said line and said subsets with voice frequency signals from said source, said amplifying means comprising a multi-stage audio frequency transistor amplifier having its input connected to said voice frequency signal source and its output connected to said line, the output stage of said amplifier including a transistor having a base, an emitter, and a collector, and means comprising a resistor connected between the collector and the base of the output stage transistor for providing inverse feedback of signal current thereby to minimize the effect of variations in the load impedance of said line on said amplifier output and to minimize coupling between said substations.

2. A combination as claimed in claim 1 wherein the voice frequency source includes a high impedance magnetic recording playback head.

3. A combination as claimed in claim 2, wherein said magnetic recording playback head is subject to stray alternating current fields, said combination further including means in the first stage of the amplifier for reducing alternating current hum, said means comprising a condenser in series with said input circuit which resonates the input circuit at a low frequency above the hum frequency to cause a considerable fall off of signal input to the amplifier at frequencies below resonance.

4. A combination as claimed in claim 2 wherein the first stage of said amplifier has an output transformer, and said magnetic recording playback head supplies to the first stage of said amplifier a signal decreasing in amplitude with increasing frequency, and wherein there are provided means in the first stage of the amplifier for compensating for the variations in the amplitude of the input signals supplied by said playback head, the last mentioned means comprising an inductor connected in parallel with a portion of the primary winding of the output transformer of the first stage, said inductor causing an increase in output signal amplitude with increasing frequency to compensate for the decrease in input signal amplitude with increasing frequency.

5. A telephone system including a line, a plurality of telephones, means for connecting a varying number of said telephones to said line whereby the load on said line is variable, and an automatic message announcer comprising: a magnetic recording playback head; a circuit arrangement comprising input, intermediate and output stages arranged in cascade, said output stage connected to said line, each of said stages including a transsistor having base, emitter and collector electrodes; high pass filter means connetcing said magnetic recording playback head to the base electrode of said input stage transistor to attenuate alternating current signals of predetermined frequencies reproduced by said magnetic recording playback head; amplitude compensation means included in said input stage to boost alternating current signals of other frequencies reproduced by said magnetic recording playback head; and impedance reduction means included in said output stage to match the output signal to said line irrespective of load variations.

6. An automatic message announcer as claimed in claim 5 wherein said high pass filter means comprise a capacitor in series with the base electrode of said input stage transistor for attenuating said predetermined frequencies received from said magnetic recording playback head; said amplitude compensation means include an inductance and a resistance connected in series between the collector and the emitter electrodes of said input stage transistor for increasing the output signal amplitude at said other frequencies received from said magnetic recording playback head; and said impedance reduction means comprise a resistance directly connected to the collector electrode of said output stage transistor and inductively coupled to the base electrode of said output stage transistor for providing inverse feedback to reduce the output impedance of said output stage.

References Cited in the file of this patent

UNITED STATES PATENTS

| | | |
|---|---|---|
| 1,984,450 | Aceves | Dec. 18, 1934 |
| 2,065,344 | Newton | Dec. 22, 1936 |
| 2,516,181 | Bruene | July 25, 1950 |
| 2,655,597 | Scales | Oct. 13, 1953 |
| 2,661,398 | Cooper et al. | Dec. 1, 1953 |
| 2,761,019 | Hall | Aug. 28, 1956 |
| 2,801,297 | Becking | July 30, 1957 |
| 2,816,179 | Gittleman et al. | Dec. 10, 1957 |
| 2,870,263 | Elliott | Jan. 20, 1959 |

OTHER REFERENCES

Radio and Television News, April 1955, page 39.